US006959859B2

(12) United States Patent
Saltsov et al.

(10) Patent No.: US 6,959,859 B2
(45) Date of Patent: Nov. 1, 2005

(54) BANKNOTE VALIDATOR WITH IMPROVED DRIVE PATH

(75) Inventors: Leon Saltsov, Thornhill (CA); Sergiy Bukhman, Toronto (CA); Oleksandr Onipchenko, Thornhill (CA); Sergiy Androsyuk, Thornhill (CA)

(73) Assignee: Cashcode Company Inc., Concord (CA)

( * ) Notice: Subject to any disclaimer, the term of this patent is extended or adjusted under 35 U.S.C. 154(b) by 151 days.

(21) Appl. No.: 10/440,180

(22) Filed: May 19, 2003

(65) Prior Publication Data

US 2004/0016798 A1 Jan. 29, 2004

(51) Int. Cl.[7] ................................................ G06F 17/60

(52) U.S. Cl. ....................... 235/379; 194/206; 271/176; 271/177

(58) Field of Search ................................ 235/379, 380; 194/206, 207; 271/3.14, 227, 240, 176, 177

(56) References Cited

U.S. PATENT DOCUMENTS

| | | | | | |
|---|---|---|---|---|---|
| 5,420,406 | A | * | 5/1995 | Izawa et al. | 235/379 |
| 5,632,367 | A | * | 5/1997 | Bergeron et al. | 194/207 |
| 5,657,846 | A | * | 8/1997 | Schwartz | 194/206 |
| 5,887,695 | A | * | 3/1999 | Hatamachi et al. | 194/207 |
| 6,457,586 | B2 | * | 10/2002 | Yasuda et al. | 209/534 |

* cited by examiner

*Primary Examiner*—Ahshik Kim

(57) ABSTRACT

The banknote validator has an efficient drive path for moving banknotes through a validating head past a series of sensors. A series of sets of drive rollers are commonly connected by a gear train and efficiently move the banknote in a manner to avoid jamming of the banknote during feeding of the banknote and during ejection of the banknote from the inlet. The configuration of the banknote pathway, the mounting of the sensors, and the drive arrangement cooperate to provide a cost effective and effective validator.

22 Claims, 10 Drawing Sheets

Section A-A

BANKNOTE VALIDATOR WITH IMPROVED DRIVE PATH

FIELD OF THE INVENTION

The present invention is related to banknote validators and in particular, to improvements in the drive and sensing of the banknote through a validating head.

BACKGROUND OF THE INVENTION

Banknote validators are now commonly used in different types of vending machines for receiving banknotes, determining denominations and the authenticity thereof. Accepted banknotes are stored in a banknote cassette and the vending machine is authorized to proceed with delivery of product in accordance with the credit value provided the customer. Banknote validators are also commonly used in gaming machines.

Banknotes of most major currencies on average have a useful life of approximately six months. The condition of the banknote greatly varies between a clean crisp banknote and a banknote that is relatively dirty with a deteriorated substrate. Banknotes have a series of security features which are examined by the validator and a prediction of the authenticity of the banknote is made. It can be appreciated that the validator must make an appropriate determination of a received banknote, however, as the condition of the banknote deteriorates, the evaluation is more difficult.

In addition, it has been found that deterioration of a banknote increases, the likelihood of the banknote being jammed in the validator, either during insertion and/or rejection of the banknote is much higher. This jamming of banknotes is a significant problem as validators are often used in an unmanned location and this causes user inconvenience and frustration. As the location is unmanned the user may seek to damage the device for not functioning properly and it is also inconvenient for the operator as a service call is required and a customer's complaint must be dealt with. If a banknote is to be rejected the validator must operate with a high probability of being capable of returning the banknote to the customer.

It can be further appreciated that a validator must operate with minimal instructions and be tolerant to a significant variation with respect to feeding of the banknote to the validator. Typically users are not particularly precise and thus a wide variation occurs. Therefore, the drive of the banknote through an evaluation passageway must properly align a banknote and move a banknote at a fairly high speed through the pathway while also being capable of returning a banknote should it be necessary. Jamming of the banknote either as it is processed through the device or as it is rejected from the device, should be minimized.

Prior art banknotes have used a series of three drive rollers for moving of a banknote through a curved banknote evaluation pathway where a series of sensors are disposed in the walls of the pathway for evaluation of the banknote as it moves therepast. Different validators have used optical sensors in combination with induction and capacitance sensors. These validators typically include an optical sensor for determining that a banknote has been inserted in the validator to activate the validator, and an optical sensor is used for determining that a banknote is about to leave the validating head and enter the banknote cassette. Banknotes typically become jammed at a large transition in the direction of the banknote pathway and adjacent the discharge of the banknote from the validating head.

The present invention provides an improved banknote validator which is less prone to banknote jamming and provides effective evaluation of the banknote as it is moved through the validating head.

SUMMARY OF THE INVENTION

A banknote validator according to the present invention comprises the validating head and an elongate power drive arrangement extending downwardly from one side of the validating head. The validating head has a bill receiving bezel with an inlet through the bezel connected to a banknote pathway through the validating head. The pathway is defined between an inner body portion and an outer body portion with the outer body portion being movable between an in use position defining said pathway between said inner and outer body portions and a service position exposing both sides of the pathway for service. The pathway includes a first straight section leading away from the bezel inlet and joining with a first curved transition. The first curved transition joins with a second straight section which forms an acute angle with the first straight section such that the pathway is partially reversed upon itself. The second straight section leads to a secured curved transition which terminates in a discharge outlet. The inner body portion has two sets of inlet drive rollers associated with the first straight section with one set of drive rollers protruding into the pathway adjacent a junction between the bezel and the inner body portion and the other set of inlet rollers protruding into the pathway adjacent the first transition. The inner body portion has two sets of discharged drive rollers adjacent a junction of the second straight section and said second curved transition. One set of the discharge rollers protrudes into the pathway in the second straight section and the other set of discharge rollers protrudes into the pathway within the second curved transition.

According to an aspect of the invention, the inlet drive rollers and the discharge drive rollers are interconnected by a gear train.

According to a further aspect of the invention, the inlet drive rollers and the discharge drive rollers are driven at the same speed by a common motor.

In yet a further aspect of the invention, the drive wheels are driven by the motor to advance the banknote through the pathway at speeds in excess of 200 mm per second.

In yet a further aspect of the invention, the pathway adjacent the inlet includes two optical sensors spaced on opposite sides of the pathway for detecting the insertion of a banknote.

In yet a further aspect of the invention each optical sensor includes an emitter and receptor on one side of the pathway and a light guide on the opposite side of the pathway. The light guide serves to return light received from the emitter to the receiver when a banknote is not in the pathway between the emitter and the light guide.

In yet a further aspect of the invention the validator includes a further optical sensor adjacent to the inlet. This further optical sensor has a light emitter at one edge of the pathway and a light receptor at an opposite edge of the pathway. The emitter emits a beam of light across the pathway to the light receptor. This light is interrupted by a banknote or the presence of any other object extending in the length of the pathway.

In yet a further aspect of the invention the emitter and receiver of the optical sensor are all provided on said inner body portion.

In yet a further aspect of the invention the passive wave guide component is provided on the outer body portion.

According to yet a further aspect of the invention the drive rollers include spring loaded idler rollers opposite the drive rollers and supported in the outer body portion. In a preferred aspect of the invention these idler rollers include a twin armed spring member with a slot between the arms for receiving the idler roller.

In yet a further aspect of the invention the validating head includes a series of sensors on each side of the pathway in said second straight section and the series of sensors on each side of the pathway are mounted on a common PC board.

In yet a further aspect of the invention one of the sensors in the second straight section is a barcode sensor.

In yet a further aspect of the invention the motor drive components of the validator are provided in the elongate power drive arrangement and motors provided in the elongate power drive arrangement have a PC board closely positioned adjacent to the motors to avoid electromagnetic interference.

In yet a further aspect of the invention the elongate power drive arrangement also include processing hardware and software for evaluating the signals of the sensors and making a prediction with respect to authenticity of the banknote. A memory receiving device is provided in the elongate power drive arrangement for receiving a removable memory stick. This allows for updating of the software of the validator by insertion of an appropriately programmed memory stick.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
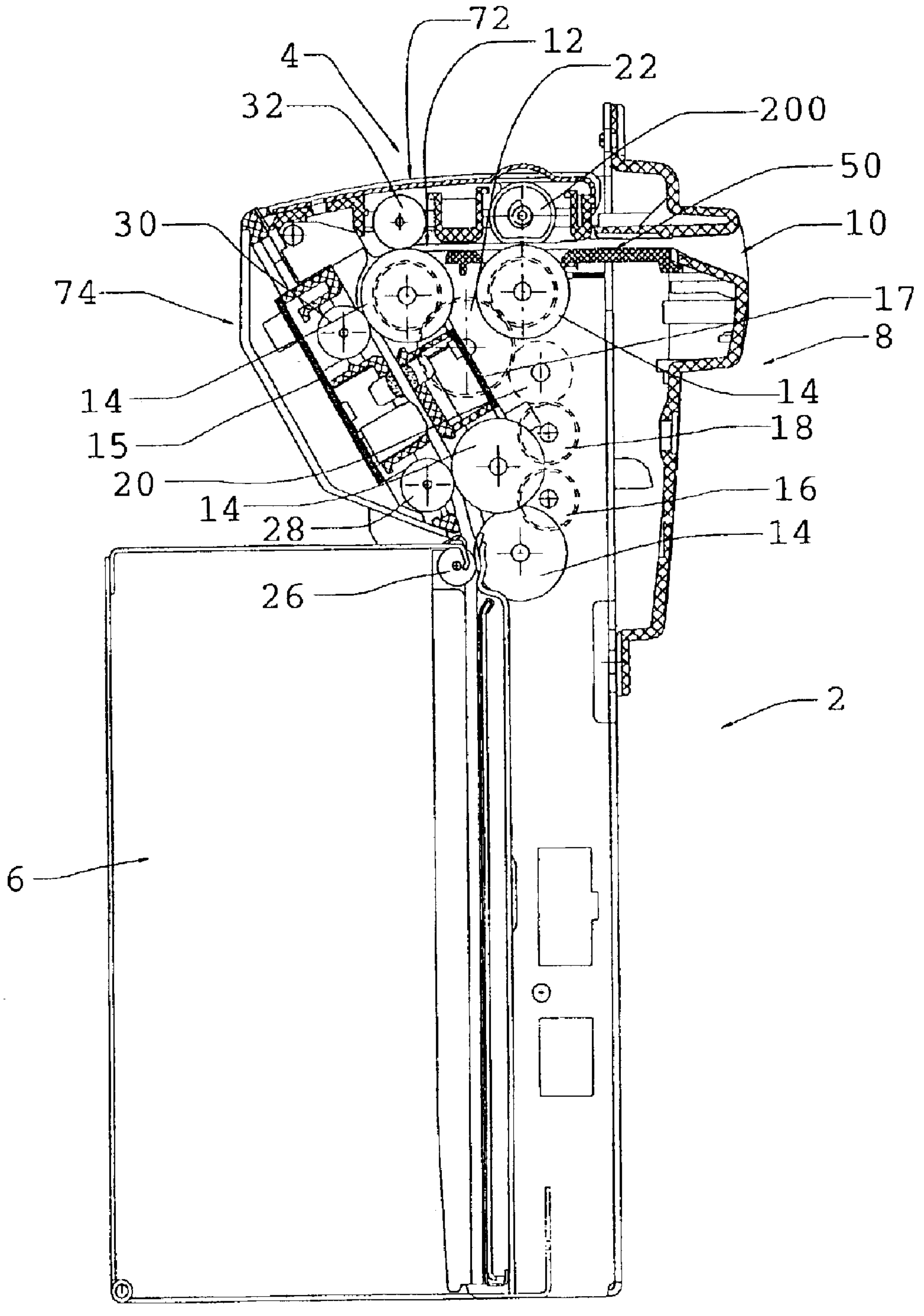
FIG. 1 is a sectional view showing various aspects of the validator.

The validator 2 shown in the drawings has a validating head 4 which receives banknotes and moves banknotes along a banknote pathway 14 towards the releasable banknote cassette 6. The banknotes are fed through the bezel 8 provided at the front edge of the validating head 4 with the banknotes fed through the inlet 10. The inlet 10 connects with the banknote pathway 12.

The banknotes are moved along the banknote pathway by means of a series of drive rollers 12 which protrude into the pathway and are all driven at the same speed. A series of gears 16, 18, 20 and 22 form a gear train and interconnect with the drive rollers 14. Idler rollers 26, 28, 30, 32 and 34 are spring bias in the outer body portions comprising components 72 and 74 (see FIG. 7). These outer body portions form one side of the banknote pathway with the inner body portion 70 defining the opposite side of the pathway.

Figure 2:
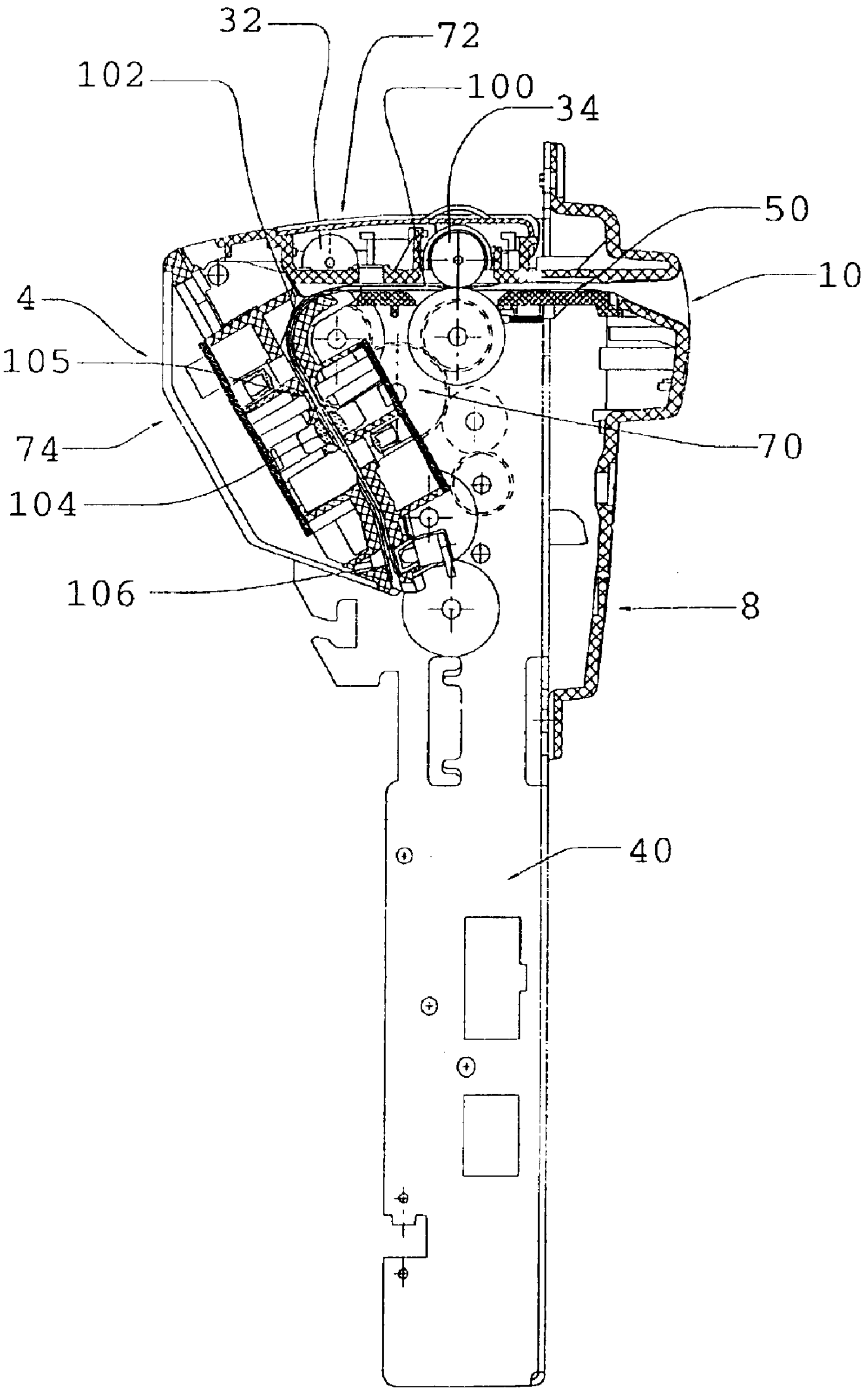
FIG. 2 is a further view of the validator with the banknote cassette removed.
Figure 3:
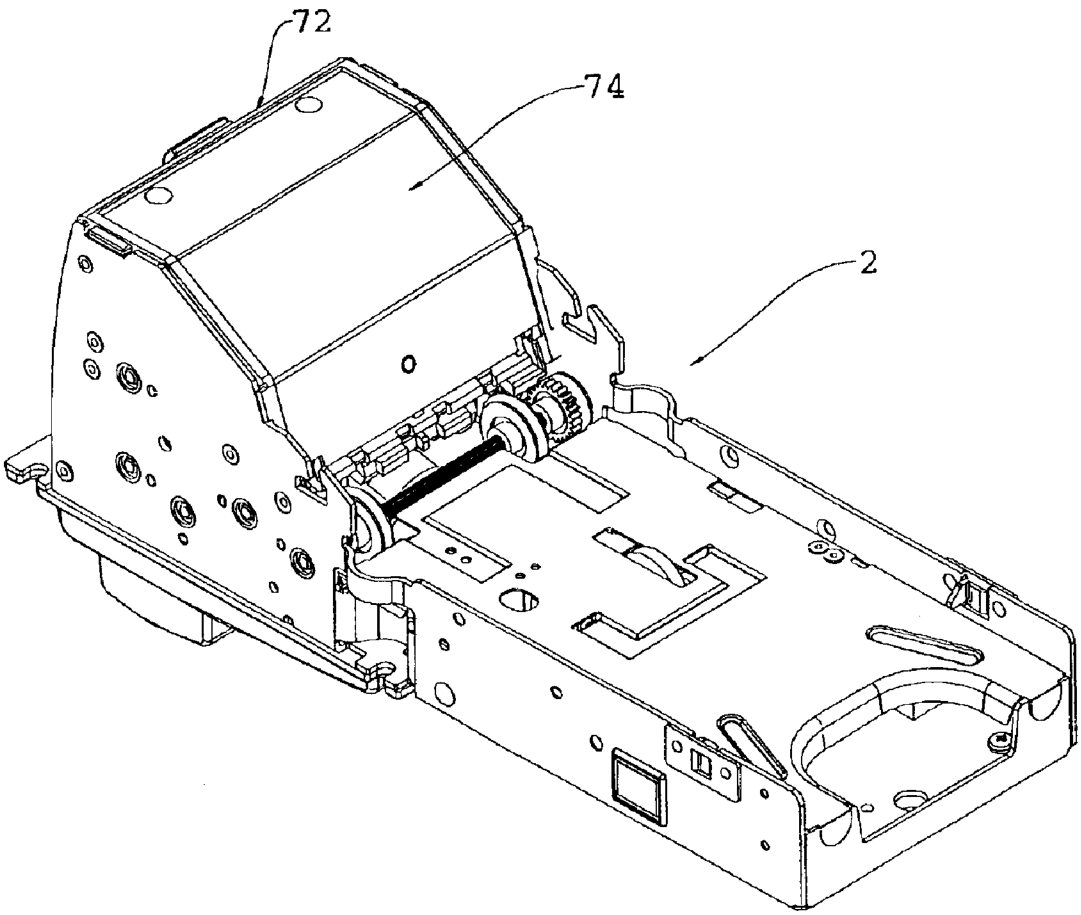
FIG. 3 is a perspective rear view of the validator showing parts of the outer body portion of the validating heads.

As shown in FIG. 2, the pathway 12 includes a first straight portion 100 which connects with a first curved portion 102 which leads to the second straight portion 104 which leads to the curve discharge portion or second curved portion 106. A series of sensors 105 are provided on either side of the second straight portion in the inner body portion 70 and outer body portions 72 and 74 for evaluating the banknote as it moves past the sensors.

Figure 7:
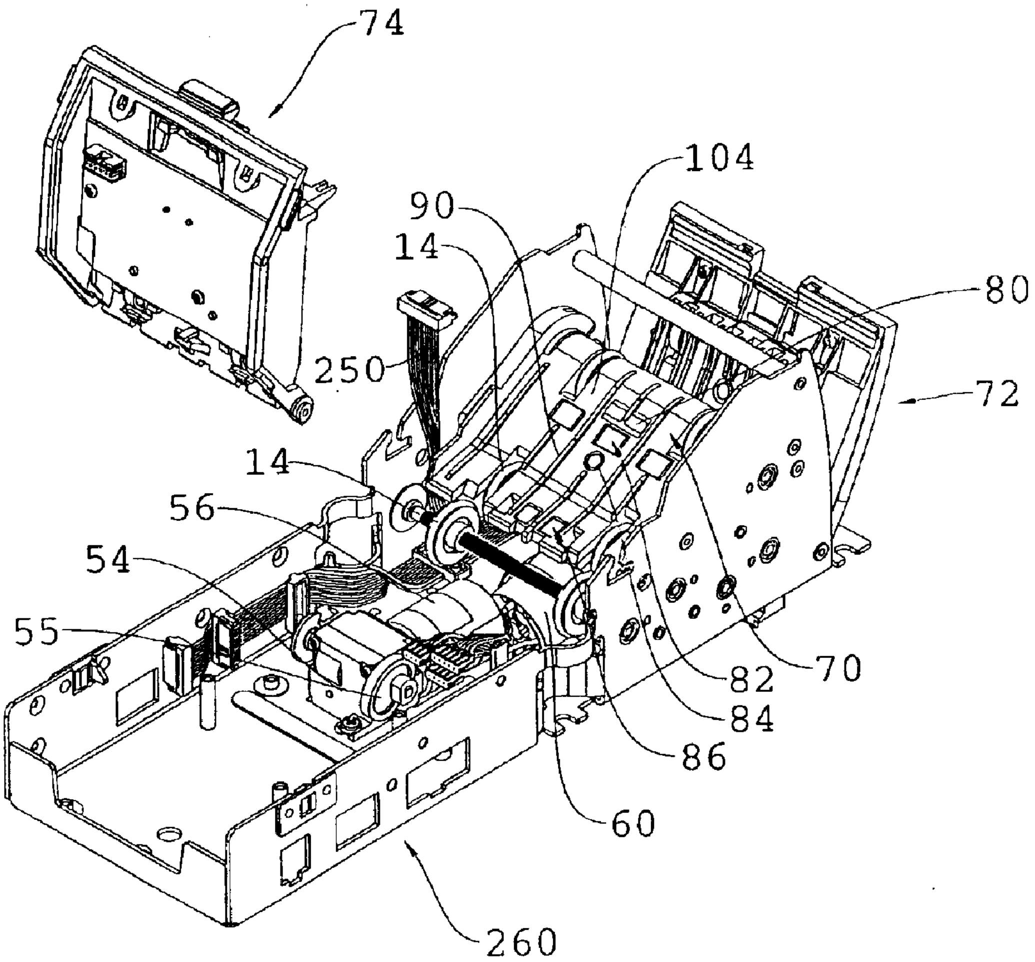
FIG. 7 is an exploded perspective view showing the outer body portion partially opened for exposing of the banknote path and also partially exploded to show further details of the drive arrangement and various sensors on the inner body portion.
Figure 8:
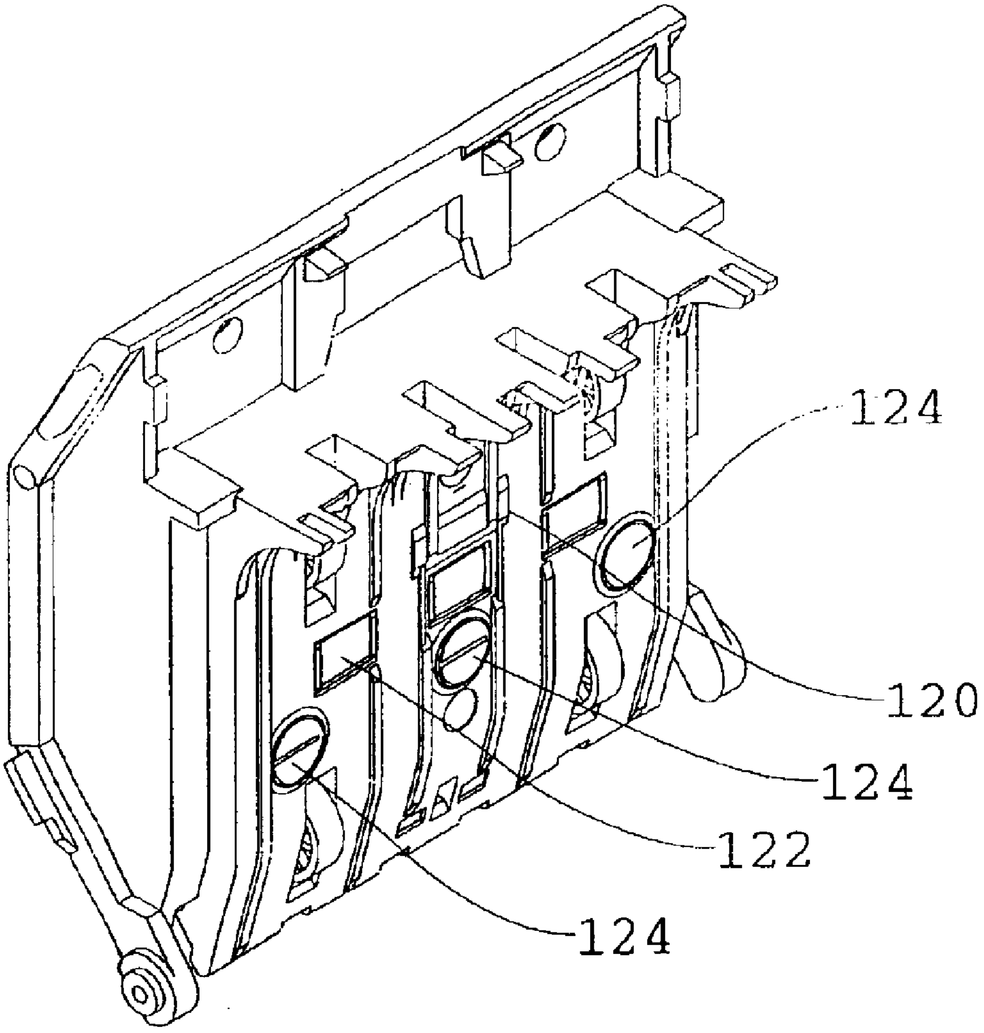
FIG. 8 is a perspective view of one part of the outer body portion showing the various sensors.
Figure 9:
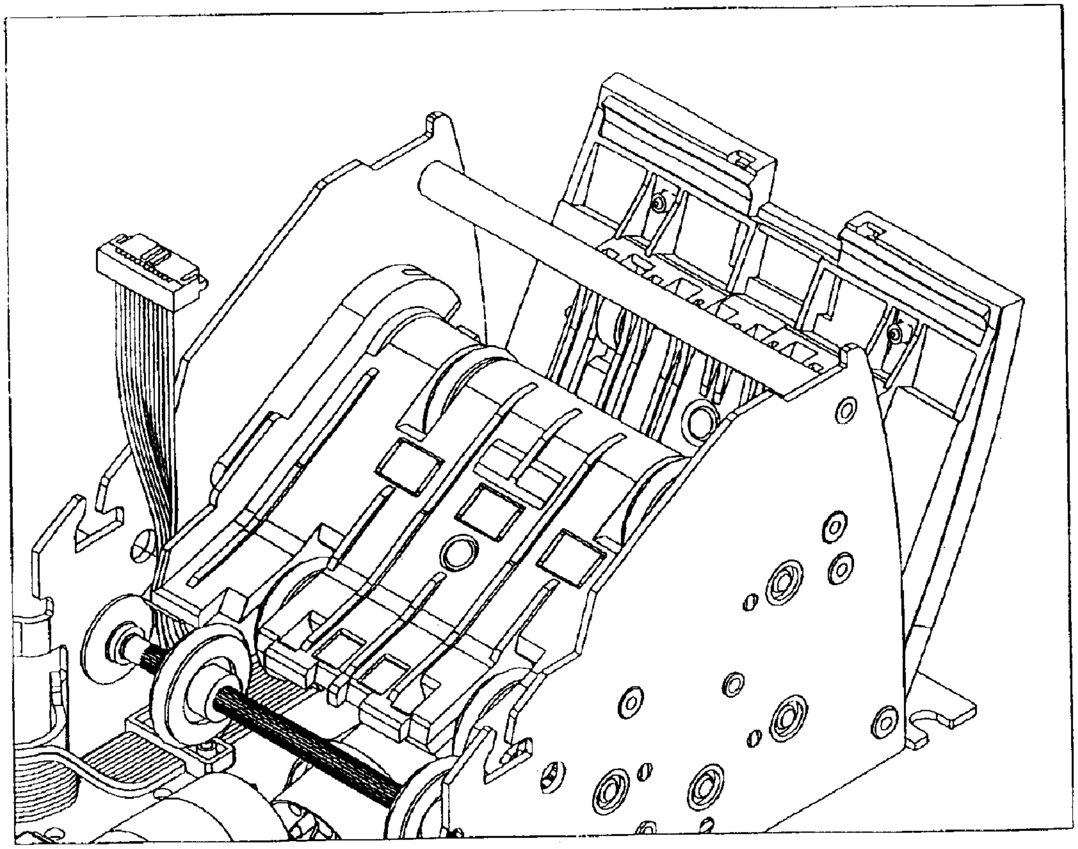
FIG. 9 is a partial perspective view showing details of the inner body portion.

As shown in FIG. 7 the inner body portion 70 has on the second straight portion 104 a capacitance sensor 80, three optical sensors 82 extending across the width of the pathway, a barcode sensor 84 and at the curved discharge portion an optical discharge sensor 86. The lower hinged portion 74 of the outer body portion can also include a series of sensors for examining the opposite side of the bill. These series of sensors are shown in FIG. 8 as capacitance sensor 120, three optical sensors shown as 122 and three inductive sensors 124. In this way, a banknote regardless of how it is inserted into the banknote inlet 10, both sides of the banknote are scanned by a series of capacitance, optical, and inductive sensors. The software for evaluation of these signals includes the corresponding signals for all orientations of the banknote in the pathway for faster processing. The drive rollers which are effectively four sets of drive roller provided at different points along the banknote pathway provide positive control of the banknote as it moves through the pathway and allows the banknote to be effectively evaluated by the time the back edge of the banknote is approximately half way through the second straight section 104. If the evaluation has not yet been complete the banknote is stopped and held in this position. As such the two drive rollers 14 adjacent the second curved portion 106 and at the output of the second straight portion 104 have positive engagement of the banknote and the banknote is still in the second straight section 104. If desired the banknote can be held relatively close to the first curved section 102 i.e., with the back edge of the banknote adjacent the early part of the second straight portion.

If a decision is made that the banknote should be rejected the two rollers at the discharge at the bottom of the second straight section can force the banknote in the opposite direction through the pathway to be engaged by the set of drive rollers at the end of the first straight section 100. Jamming of the banknote in the sensor section of the second straight section 104 is effectively avoided as the back edge of the banknote has not cleared the sensors. The banknote is basically free to float in the pathway and does not have to move a substantial distance before it is engaged by the next set of drive rollers at the end of the first straight section 104. Once it is engaged by these drive rollers the banknote can then continue to be driven out through the pathway and through the inlet 10.

It has been found that this arrangement of drive rollers is very effective in avoiding jamming of banknotes which previously occurred in the validator particularly adjacent the second straight portion of the banknote pathway 12. Furthermore, as shown in FIG. 1 the reversed direction of the drive rollers causes the idler roller 200 to become active. Basically this roller is free to rotate in the reverse direction and thus will start to rotate with the reverse direction of the drive roller 14 as a banknote is ejected. The idler rollers 200 enter the neutral position shown in FIG. 1 when the drive rollers are rotated in the direction advancing a banknote along the pathway. These rollers 200 are provided on opposite sides of the pathway and assist in moving a rejected banknote through the inlet 10. During the in feed of a banknote the rollers 200 move to a clear position.

The initial set of drive rollers 14 provided at the input to the validating head have three sets of drive rollers across the banknote pathway. The center roller has conventional idler roller and is always active. The two outer rollers and there special clear rollers 200 are only active during rejection of a banknote.

Figure 5:
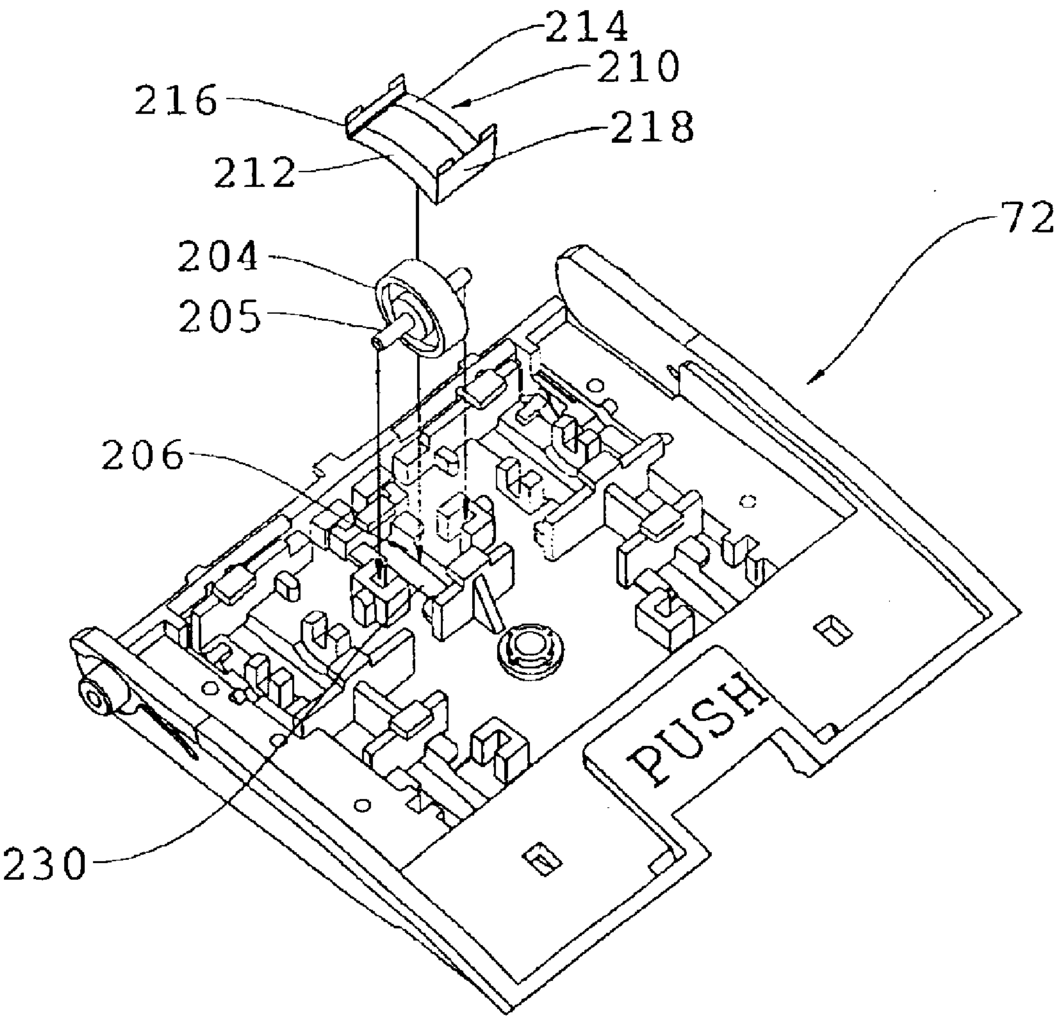
FIG. 5 is a partial exploded view of part of the outer body portion.
Figure 6:
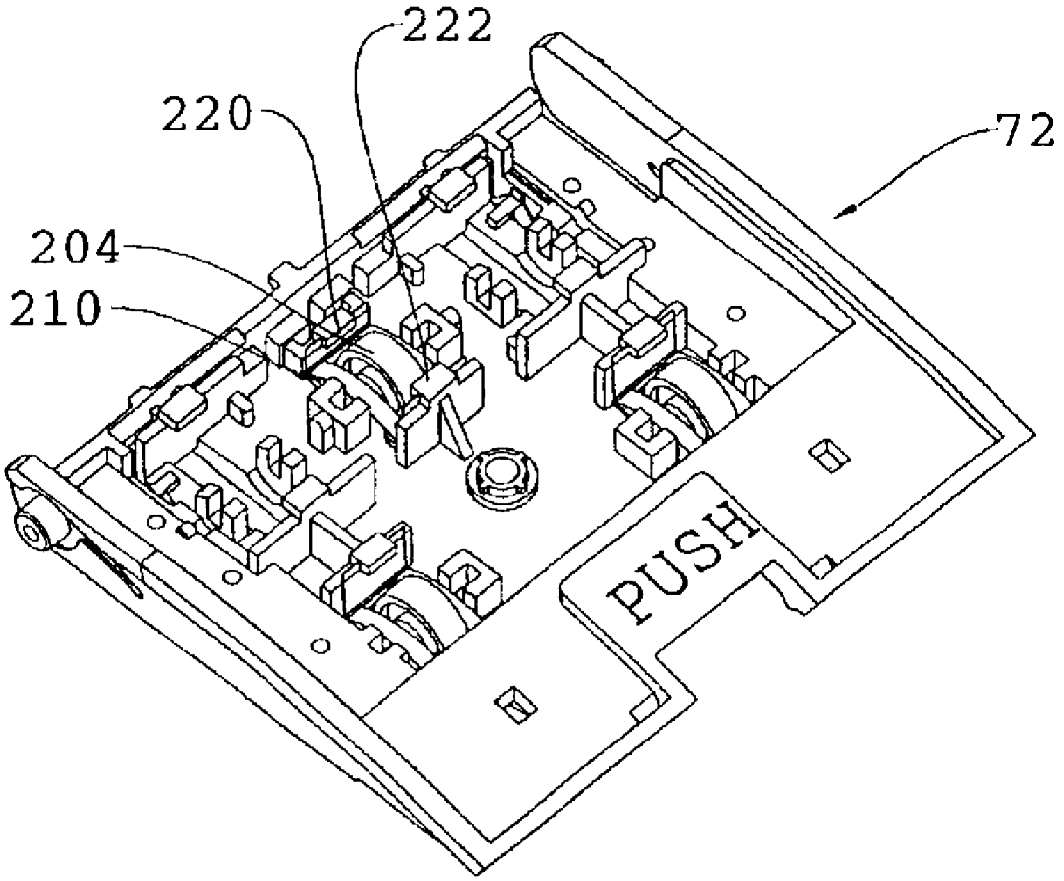
FIG. 6 is a view similar to FIG. 5 with various components assembled in the outer body portion.

FIG. 5 shows mounting of the idler roller 204 in the top hinged portion 72 of the outer body portion. A mounting recess 206 is provided in the plastic molded component 72 and receives the shaft 205 of the idler roller 204. Once the idler roller is located in the molded component 72, a twin spring arm member 210 inserted. As shown spring arm member 210 has two spring arms 212 and 214 joined at either end by flange portions 216 and 218. This single component is dropped in the mounting arrangement 206 and is captured behind retaining members 220 and 222 of the mounting arrangement. Spring arms 212 and 214 can deflect relative to the flanges 216 and 218 and allow movement of the idler roller perpendicular to the pathway. A top cover portion is then added to member 72 as part of the finished product. The idler roller extends through the port shown as 230 but can move upwardly against the spring bias.

FIG. 7 shows details of the inner body portion 70 and outer body portions 72 and 74. It can be seen that the pathway 12 has a series of ribs 90 extending in the length of the pathway 12 which serve to minimize the drag on a banknote and to position the banknote within the pathway and limiting the variation of the spacing of the banknote relative to the various sensors. The drive rollers 14 extend partially into the pathway and typically have an outer rubber surface. An electrical ribbon connector 250 serves to connect the various optical sensors in the lower hinged portion 74 to the processing arrangement provided in the elongate power and processing extension 260. A printed circuit board 44 provides hardware for processing of the signal and includes memory for software for evaluating the signals of the sensors. A first motor 56 cooperates with the drive train 54 for moving the cam 55 used to drive a plate member which is part of the banknote cassette. The motor 60 serves to drive the drive rollers 14. A driver arrangement is provided on a printed circuit board 58 shown in FIG. 4 to reduce extraneous electromagnetic signals. By keeping the driver arrangement of motor 60 in close proximity to motor 60 the electrical leads do not cause any extraneous electromagnetic interference with respect to the sensors.

As can be appreciated the motor 60 is operating as the banknote is advanced through the banknote pathway and the evaluation of the banknote is being conducted as the banknote is moving through the pathway. Drive rollers typically move the banknote at speeds between 200 and 340 millimeters per second and the validator can make a determination in most cases as the banknote moves through the validator. It is also possible to collect information as the banknote moves through the validator, stop the banknote with the trailing portion thereof still in the second straight section, and thereafter start the calculators for determining authenticity.

For most applications, the banknote is stopped in the second straight section and held in this section awaiting a confirmation signed from the host machine, for example a vending machine, or gaming machine, to accept the bill or reject it. This decision is made by the host machine which sends a signal to the validator. The validator typically sends a signal to the host machine regarding the denomination after confirming authenticity and awaits further instructions from the host machine.

As the processing is carried out as the banknote moves along the pathway the motor 60 is operating. The provision of the driver arrangement for the motor on the printed circuit board closely associated with the motor, assists in maintaining a high quality signal of various sensors by reducing extraneous electrical signals which occur with long lead lines.

It can also be seen from the various exploded views of the drawings that the sensing is provided on opposite sides of the pathway in the second straight section. The sensors mounted on their own common PC board on each side of the pathway as clearly shown in FIG. 1. The one set of sensors include the PC board 15 and the sensors provided on the inner body portion are mounted on the common PC board 17.

Figure 4:
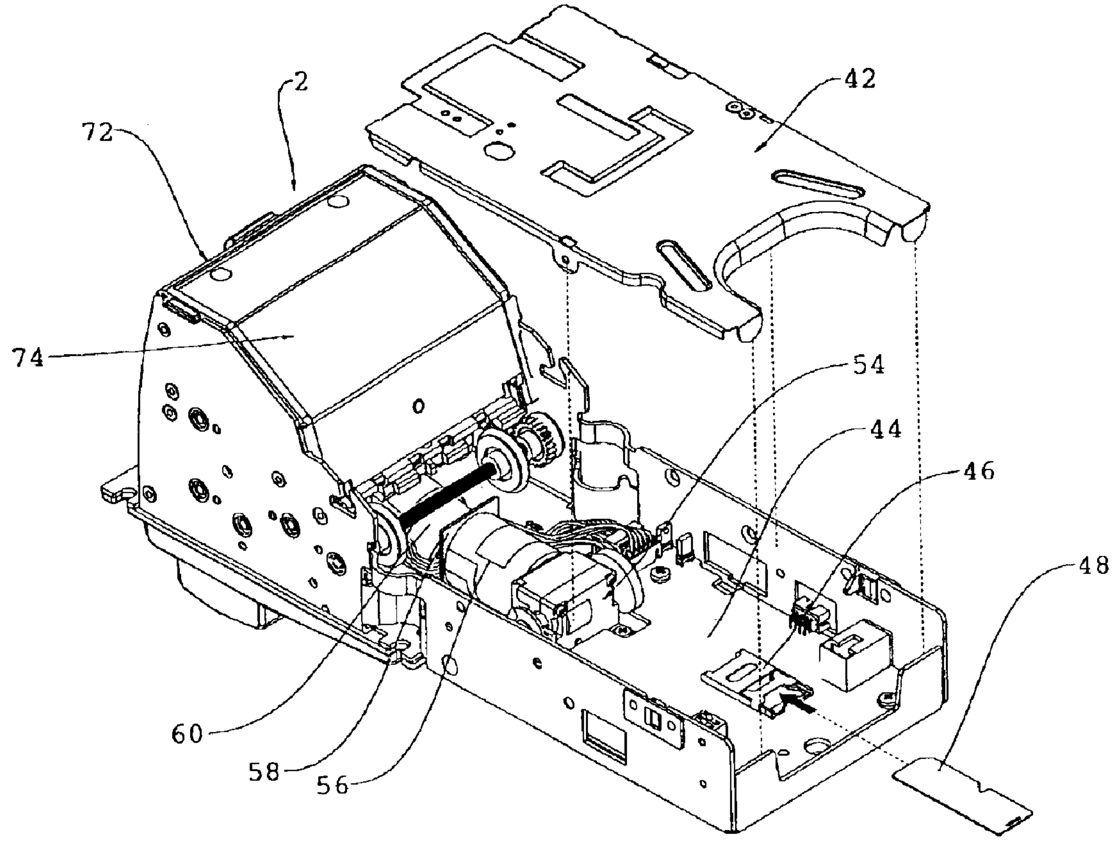
FIG. 4 is an exploded perspective view showing details of the elongate power drive arrangement.

The exploded perspective view of FIG. 4 shows a memory receiving receptor 46 which cooperates with the memory stick 48. From time to time is it necessary to update a validator either for processing different banknotes or different currency or merely to update the software used to evaluate the signals from the sensors. Memory stick 48 provides a simple means for updating of the software used by the validator. These components are protected within the validator behind the cover panel 42 mechanically fastened to the validator.

Figure 10:
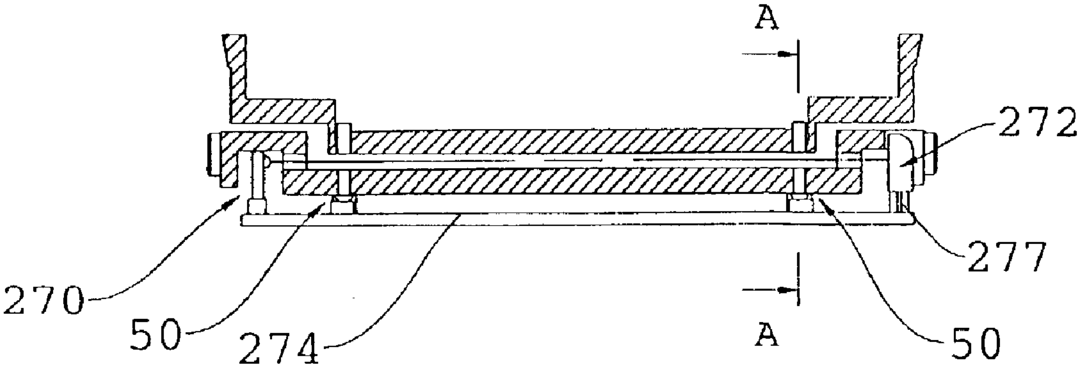
FIG. 10 is a sectional view showing various optical sensors of the input to the validator.
Figure 11:
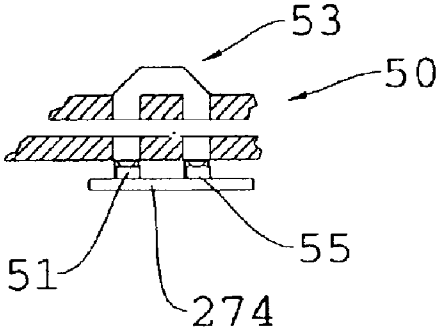
FIG. 11 is a sectional view taken along the lines A—A of FIG. 10.

FIGS. 10 and 11 show details of the optical sensor provided at the input to the validator. These optical sensors include a banknote leading edge sensors provided at opposite edges of the pathway and a light emitter 270 on one side of the pathway and a light receiving arrangement 272 provided on the opposite side of the pathway. These components are mounted on a common printed circuit board 274. The leading edge sensors 50 have an emitter 51 which emits light and aims it across the pathway. If a banknote is not present it is received by a light guide arrangement 53. The light guide arrangement bends the light and returns it across the pathway to the receptor 55. The emitter and the receptor are both provided on the same side of the pathway and are mounted on a common circuit board 274. The light guide 53 is a passive element provided on the top hinged portion 74 of the outer body portion 72 and requires no electrical connection.

The light emitter 270 sends a beam of light across the width of the pathway to be received by the photo receiver 272. The photo receiver 272 is connected to the printed circuit board 274 by electrical leads 277. It is also possible to position the receiver at 272 directly on the board 274 and use a light guide to direct the received light to the photo receiver. This across the pathway light beam serves to detect conditions which may indicate a fraudulent activity. It is known to attach a string or tape or other elongate member to a banknote as it is being received by the validator. It is typically attached to the back edge. Once the banknote validator has approved the banknote, the user quickly tries to pull the banknote back out of the validator. The beam of light directed across the banknote pathway serves to detect the presence of these types of tapes, threads or strings after the back edge of the banknote has passed the sensor.

The banknote validator as shown in the drawings effectively processes banknotes in an accurate manner at high speeds and can be used with a wide range of banknotes having different security characteristics. Speeds of 300 millimeters per second have proven quite effective in providing fast processing of bills in combination with good evaluation of the authenticity of the banknotes. The particular arrangements of drive rollers and idler rollers also serve to reduce banknote jams and provide effective and positive drive of a rejected banknote out of the validator.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A banknote validator comprising a validating head and an elongate power drive arrangement extending downwardly from one side of said validating head, said validating head having a bill receiving bezel with an inlet to a banknote pathway through said validating head, said pathway being defined between an inner body portion and an outer body portion with said outer body portion being movable between an in use position defining said pathway between said inner and outer body portions and a service position exposing both sides of said pathway for service; said pathway including a first straight section leading away from said bezel inlet and joining with a first curved transition, said curved transition joining with a second straight section which forms an acute angle with said first straight section such that said pathway is partially reversed, said second straight section leading to a second curved transition which terminates in a discharge outlet; said inner body portion having two sets of inlet drive rollers associated with said first straight section with one set of drive rollers protruding into said pathway adjacent a junction between said bezel and said inner body and the other set of inlet drive rollers protruding into said pathway adjacent said first transition; said inner body portion having two sets of discharge drive rollers adjacent a junction of said second straight section and said second curved transition, one set of said discharge rollers protruding into said pathway in said second straight section and the other set of discharge rollers protruding into said pathway within said second curved transition.

2. A validator as claimed in claim 1 wherein said inlet drive rollers and said discharge drive rollers are interconnected by a gear train.

3. A validator as claimed in claim 1 wherein said inlet drive rollers and said discharge drive rollers are driven at the same speed by a common motor.

4. A validator as claimed in claim 1 wherein said motor and drive wheels cooperate to advance a banknote through said pathway at speeds in excess of 200 mm/sec.

5. A validator as claimed in claim 1 wherein said pathway adjacent said inlet includes two optical sensors spaced on opposite sides of said pathway for detecting insertion of a banknote.

6. A validator as claimed in claim 5 wherein each optical sensor includes an emitter and receptor on one side of said pathway and a light guide on the opposite side of the pathway whereby emitted light in the absence of a banknote is received by the light guide and returned through said pathway to said receiver.

7. A validator as claimed in claim 6 wherein said emitter and said receptor of each optical sensor are aligned in the length of said pathway.

8. A validator as claimed in claim 6 including a further optical sensor adjacent said inlet, said further optical sensor having a light emitter at one edge of said pathway and a light receptor at an opposite edge of said pathway, said emitter emitting a beam of light across said pathway to said light receptor.

9. A validator as claimed in claim 8 wherein said further optical sensor has both said emitter and said light receptor on said inner body portion.

10. A validator as claimed in claim 9 including a pair of discharge optical sensors on opposite sides of a centerline of said pathway adjacent said discharge outlet.

11. A validator as claimed in claim 10 wherein each discharge optical sensor includes an emitter and a receptor on one side of said pathway and spaced a short distance one from the other, said emitter directing a beam of light across said pathway to a light guide on the opposite side of said pathway, said light guide returning the light across the pathway to said receptor.

12. A validator as claimed in claim 1 wherein said drive rollers include spring loaded idler rollers opposite said drive rollers and supported in said outer body portion.

13. A validator as claimed in claim 1 wherein said inner and outer body portions along second straight include a series of sensors for evaluating properties of banknotes.

14. A validator as claimed in claim 13 wherein said series of sensors include a capacitance sensor, a color optical sensor, and an inductive sensor.

15. A validator as claimed in claim 14 wherein each sensor includes part thereof on opposite sides of said pathway and the sensor parts on one side of the pathway are mounted on a common PC board.

16. A validator as claimed in claim 14 wherein said series of sensors includes a bar code sensor.

17. A validator as claimed in claim 1 including means for receiving a removable memory device for updating software by insertion of a removable memory device in said means for receiving.

18. A validator as claimed in claim 17 wherein said means for receiving is designed to receive a memory stick.

19. A validator as claimed in claim 1 wherein said inner body portion between said bezel and said pathway includes a gear train linking said drive rollers and causing said drive rollers to rotate at the same speed and direction of rotation.

20. A validator as claimed in claim 19 wherein said gear train is connected to a drive motor positioned below and exterior to said inner and outer body portions.

21. A validator as claimed in claim 1 wherein said one set of drive rollers protruding into said pathway adjacent said junction between said bezel and said inner body has a center drive rollers and an anti-jamming roller disposes either side of said center drive rollers said anti-jamming rollers being non cylindrical and being in a clear non drive relationship when banknote is moved from the inlet through the validator and operate in a drive relationship when a banknote is rejected from said validator.

22. A validator claimed in claim 21 wherein said anti-jamming rollers have a one way clutch allowing slippage during driving of banknote from said inlet through the validator.

* * * * *